(12) United States Patent
Zhou et al.

(10) Patent No.: US 8,598,832 B2
(45) Date of Patent: Dec. 3, 2013

(54) CONTROL SYSTEM OF MULTI-SHAFT SERVO MOTOR

(75) Inventors: Zhaoyong Zhou, Guangdong (CN); Yajing Liu, Guangdong (CN); Tiecai Li, Guangdong (CN); Yan Zhang, Guangdong (CN); Guijie Yang, Guangdong (CN); Hongpeng Wang, Guangdong (CN)

(73) Assignee: Shenzhen Academy of Aerospace Technology, South District of High-Technology Industrial Park, Nanshan District, Shenzhen, Guangdong (CN)

( * ) Notice: Subject to any disclaimer, the term of this patent is extended or adjusted under 35 U.S.C. 154(b) by 469 days.

(21) Appl. No.: 13/056,308

(22) PCT Filed: Nov. 11, 2008

(86) PCT No.: PCT/CN2008/073010
§ 371 (c)(1),
(2), (4) Date: Jan. 27, 2011

(87) PCT Pub. No.: WO2010/054506
PCT Pub. Date: May 20, 2010

(65) Prior Publication Data
US 2011/0127942 A1    Jun. 2, 2011

(51) Int. Cl.
*H02P 5/00* (2006.01)
(52) U.S. Cl.
USPC ....... 318/625; 318/568.18; 318/599; 318/615

(58) Field of Classification Search
USPC ............... 318/560, 568.17, 568.18, 569–575, 318/590, 599, 615–618, 625, 700
See application file for complete search history.

(56) References Cited

U.S. PATENT DOCUMENTS

| | | | | |
|---|---|---|---|---|
| 4,639,653 A | * | 1/1987 | Anderson et al. | 318/599 |
| 4,763,055 A | * | 8/1988 | Daggett et al. | 318/568.14 |
| 7,072,740 B2 | * | 7/2006 | Iribe et al. | 700/245 |

FOREIGN PATENT DOCUMENTS

WO  PCT/CN2008/073010    8/2009

* cited by examiner

*Primary Examiner* — Bentsu Ro
(74) *Attorney, Agent, or Firm* — Global IP Services; Tianhua Gu

(57) ABSTRACT

A control system of multi-shaft servo motor comprises a position loop module (400) for receiving a position loop given value and a position feedback value of respective shelves and figuring out a velocity loop given value; a velocity loop module (500) for receiving the velocity loop given value and a velocity feedback value of respective shelves and figuring out a current loop given value; a current loop module (200) for receiving the current loop given value and a current feedback value of respective shelves and outputting a current loop output value; a PWM signal generation module (300) for receiving the current loop output value from the current loop module (200) and generating a PWM signal for controlling respective shelves of the servo motor; and a multi-shaft time sequence control module (700).

10 Claims, 17 Drawing Sheets

CONTROL SYSTEM OF MULTI-SHAFT SERVO MOTOR

CROSS REFERENCE TO RELATED PATENT APPLICATION

The present application is the US national stage of PCT/CN2008/073010 filed on Nov. 11, 2008, which application is incorporated herein by reference.

FIELD OF THE INVENTION

The present invention relates to control field, more particularly, relates to a control system of multi-shaft servo motor.

BACKGROUND OF THE INVENTION

A motor is main part for motion control. With the development of science and technology, multi-shaft servo motors should be controlled at the same time, such as spindle drive, and X, Y shaft drive for feeding of numerical control milling machine; spindle drive, and X, Y, Z shaft drive for feeding of numerical control milling machine. However, for robot and robot hand, a plurality of shelves should be controlled.

No control chip of multi-shaft servo motor has been disclosed in prior art. Accordingly, a control chip of single shaft servo motor has been used to control each shelf respectively. Wherein, LM628, and LM629 square wave brushless motor position control chip, IR2102 sine wave brushless motor velocity control chip, which have perfect performance, are the most representative.

The LM628 motion control chip recommend by National Semiconductor of US and MCX314 series motion control chip recommend by Plenty Island of Japan can be called as positions loop servo control chip, and also can be used for upper control of a servo unit. However, actually, such chips comprise no lower control link, such as motor vector control, motor velocity control and moment closed loop control. Such chips have low integration degree, and their functions can be replaced by DPS completely, so have small meanings.

When employing a control system of single shaft servo motor in prior art to control each shelf respectively, asynchrony is easy to come out. Accordingly, a control system of multi-shaft servo motor which can control a plurality of shelves at the same time is urgently needed.

SUMMARY OF THE INVENTION

The objective of this invention is to overcome the problem that when employing a control system of single shaft servo motor in prior art to control each shelf respectively, asynchrony is easy to come out, and provide a control system of multi-shaft servo motor which may implement synchronous control for a plurality of shelves at the same time.

In order to solve the above-mentioned technical problem, the present invention constructs a control system of multi-shaft servo motor, which comprises a position loop module for receiving a position loop given value and a position feedback value of respective shelves and figuring out a velocity loop given value; a velocity loop module for receiving the velocity loop given value and a velocity feedback value of respective shelves and figuring out a current loop given value; a current loop module for receiving the current loop given value and a current feedback value of respective shelves and outputting a current loop output value; a PWM signal generation module for receiving the current loop output value from the current loop module and generating a PWM signal for controlling respective shelves of the servo motor; and a multi-shaft time sequence control module for controlling the position loop module, the velocity loop module, the current loop module and the PWM signal generation module to receive and process the signals.

In the control system of multi-shaft servo motor according to present invention, the control system of multi-shaft servo motor further comprises a A/D convertor for obtaining the position feedback value and/or current feedback value under the control of the multi-shaft time sequence control module; a velocity measuring module for obtaining the velocity feedback value of respective shelves under the control of the multi-shaft time sequence control module.

In the control system of multi-shaft servo motor according to present invention, the A/D convertor is further used for obtaining the position loop given value, the velocity loop given value, and/or the current loop given value under the multi-shaft time sequence control module.

In the control system of multi-shaft servo motor according to present invention, when the control system of multi-shaft servo motor is controlled by the multi-shaft time sequence control module to operate in the position ring, the position ring module obtains the position ring given value and the position feedback value from the A/D convertor, the velocity ring module obtains the velocity ring given value from the position ring module and obtains the velocity feedback value from the velocity measuring module, the current ring module obtains the current ring given value from the velocity ring module and obtains the current feedback value from the A/D convertor; when the control system of multi-shaft servo motor is controlled by the multi-shaft time sequence control module to operate in the velocity ring, the velocity ring module obtains the velocity feedback value from the velocity measuring module and obtains the velocity ring given value from the A/D convertor, the current ring module obtains the current ring given value from the velocity ring module and obtains the current feedback value from the A/D convertor; when the control system of multi-shaft servo motor is controlled by the multi-shaft time sequence control module to operate in the current ring, the current ring module obtains the current feedback value and the current ring given value from the A/D convertor.

In the control system of multi-shaft servo motor according to present invention, the A/D convertor further comprises a A/D interface unit, a A/D time sequence control unit and a first data latch, wherein, when the control system of multi-shaft servo motor is operating in the position ring, the A/D interface unit obtains the position ring given value, the position feedback value, and the current feedback value; when the control system of multi-shaft servo motor is operating in the velocity ring, the A/D interface unit obtains the velocity ring given value, the current feedback value; when the control system of multi-shaft servo motor is operating in the current ring, the A/D interface unit obtains the current ring given value and the current feedback value; the first data latch is used to latch the obtained values under the control of the A/D time sequence control unit.

In the control system of multi-shaft servo motor according to present invention, the control system of multi-shaft servo motor further comprises a current calibration module for calibrating the current feedback value from the A/D convertor and sending the calibrated current feedback value to the current ring module.

In the control system of multi-shaft servo motor according to present invention, the velocity measuring module comprises a code disc interface unit, a M/T velocity measuring unit and a second data latch, wherein, the code disc interface unit is used to obtain an angular displacement of each shaft, the M/T velocity measuring unit is used to transform the angular displacement to the velocity feedback value; the second data latch is used to latch the velocity feedback value under the control of the multi-shaft time sequence control module.

In the control system of multi-shaft servo motor according to present invention, the position ring module further comprises a position ring modulator and a position ring data latch; the position ring modulator is used to receive the position ring given value and the position feedback value and to generate the velocity ring given value, the position ring data latch is used to latch the position ring given value, the position feedback value and/or the velocity ring given value under the control of the multi-shaft time sequence control module.

In the control system of multi-shaft servo motor according to present invention, the velocity ring module further comprises a velocity ring modulator and a velocity ring data latch; the velocity ring modulator is used to receive the velocity ring given value and the velocity feedback value and to generate the current ring given value, the velocity ring data latch is used to latch the velocity ring given value, the velocity feedback value and/or the current ring given value under the control of the multi-shaft time sequence control module.

In the control system of multi-shaft servo motor according to present invention, the current ring module further comprises a current ring modulator and a current ring data latch; the current ring modulator is used to receive the current ring given value and the current feedback value and to generate the current ring output value, the current ring data latch is used to latch the current ring given value, the current feedback value and/or the current ring output value under the control of the multi-shaft time sequence control module.

By employing the control system of multi-shaft servo motor, following beneficial effects are obtained.

(1) Problem that asynchrony comes out when employing a control system of single shaft servo motor in prior art to control each shelf respectively is solved;

(2) The internal time is guaranteed by that different inputs of weak signals such as position, current, velocity and so on are sampled while the outputting is constant, and then outputting signals with strong amplitude are outputted at the same time, which guarantees that each shaft has best electromagnetic compatibility capability on principle;

(3) Fast capability is also obtained, as the dynamic capability of the control system of multi-shaft servo motor is higher than the microprogram controller and the digital signal processor for almost one order of magnitude;

(4) The volume is minimized, the dependability is high, the cost is low and the power consumption is small.

BRIEF DESCRIPTION OF THE DRAWINGS

So as to further explain the invention, an exemplary embodiment of the present invention will be described with reference to the below drawings, wherein.

DETAILED DESCRIPTION OF THE PREFERRED EMBODIMENT

Figure 1:
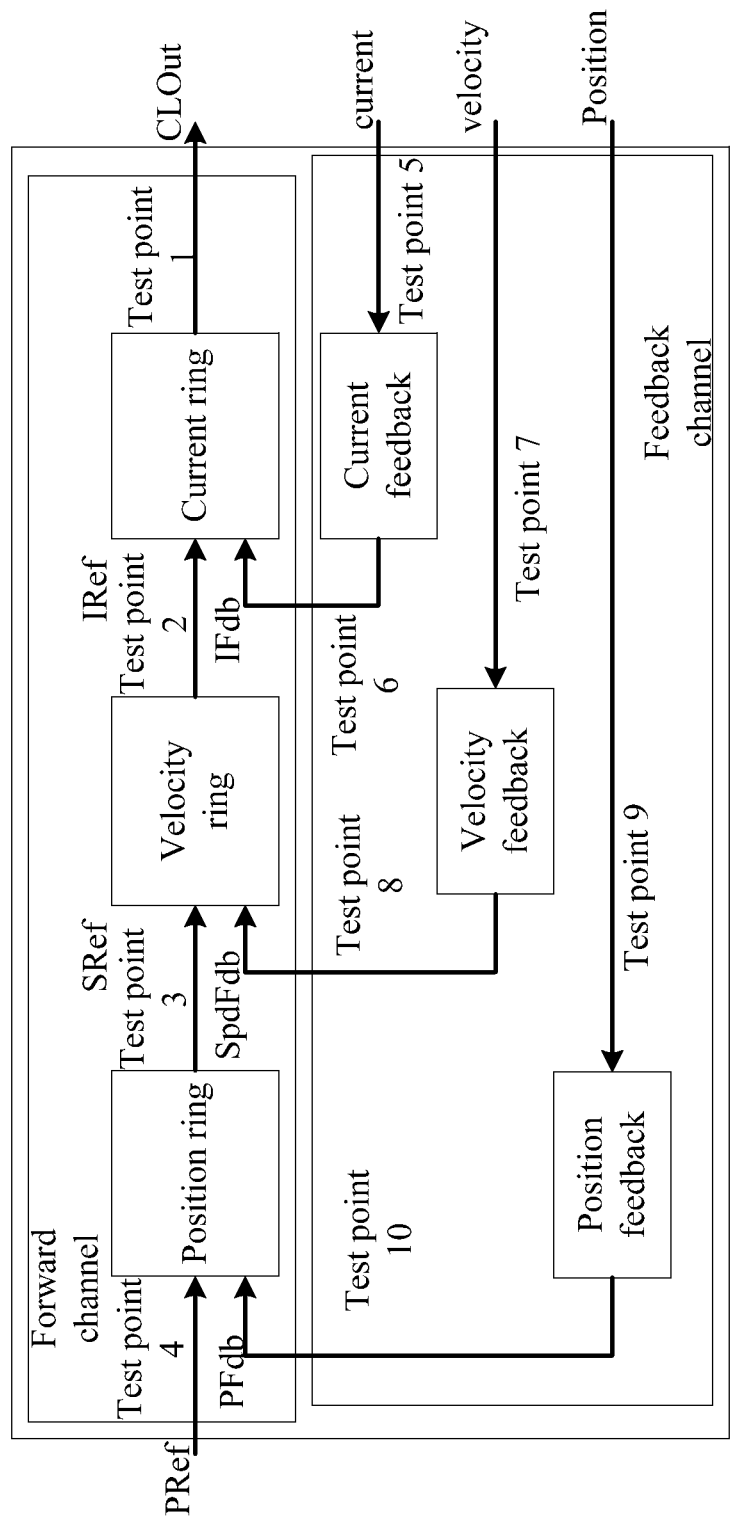
FIG. 1 is a model diagram of the control system of multi-shaft servo motor according to present invention.

As shown in FIG. 1, the system model comprises two parts, that is, a forward channel and a feedback channel. Wherein, the model of the forward channel is described in FIG. 2. The port description of the model shown in FIG. 2 is as follows:

Model
Input [11:0] PRef;
Input [14:0] IFdb;
Input [14:0] VFdb;
Input [11:0] PFdb;
Output [15:0] CLOut;
KpP, KiP, KdP, PbitsP, IbitsP, DbitsP, PlimitP, PlimitN, KpV, KiV, PbitsV, IbitsV, VlimitP, VlimitN, KpI, KiI, PbitsI, IbitsI, IlimitP, IlimitN in FIG. 1-2 are parameter which can be set. Each of CLUpdate, VLUpdate, PLUpdate can be used to control the calculation of the current ring, velocity ring and the position ring.

Figure 2:
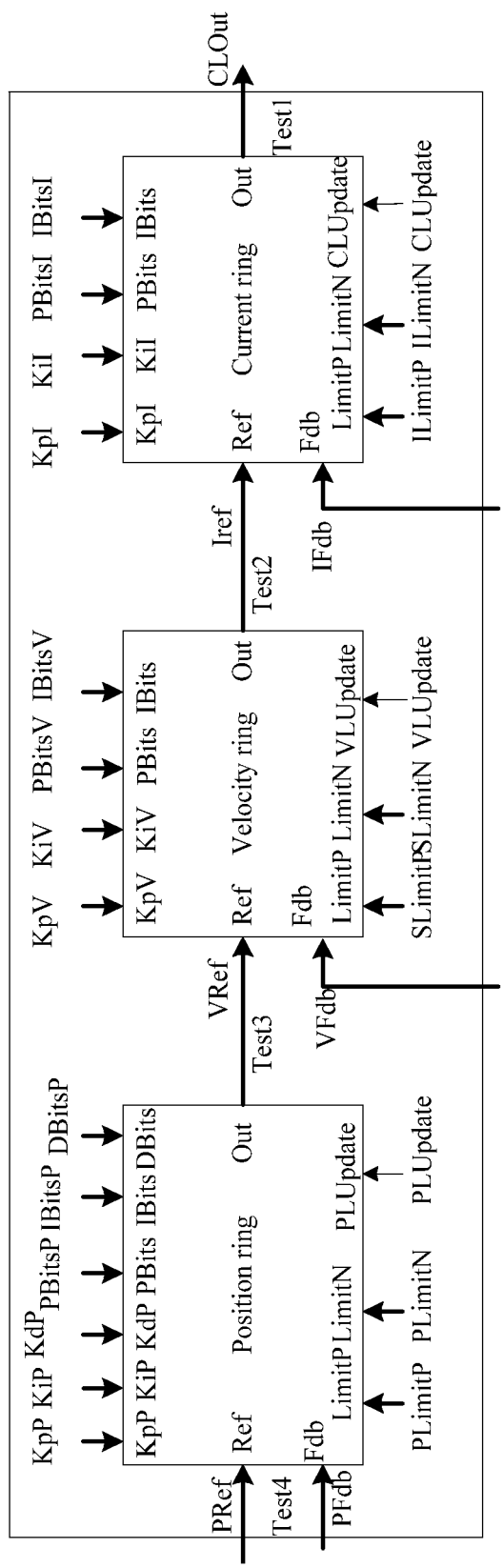
FIG. 2 is a model diagram of a forward channel system of the control system of multi-shaft servo motor according to present invention.

FIG. 2 can be described by following language:

```
If  PLUpdate then
Do 'PositionLoop';
```

```
        Do 'VelocityLoop';
        Do 'CurrentLoop';
     Else if VLUpdate then
        Do 'VelocityLoop';
        Do 'CurrentLoop';
     Else if CLUpdate then
        Do 'CurrentLoop';
     Endif
```

Wherein, PositionLoop is the model of the position ring forward channel, the VelocityLoop is the model of the velocity ring forward channel; CurrentLoop is the model of the current ring forward channel; CLUpdate is a time sequence control signal for controlling calculation of the current ring; VLUpdate is a time sequence control signal for controlling calculation of the velocity ring; PLUpdate is a time sequence control signal for controlling calculation of the position ring; CLUpdate, VLUpdate, PLUpdate signals are generated by programming, and they have fixed frequencies, which are each corresponding to fc, fv, fp. The relationship between the fc, fv, fp is as follows:

$$f_C = n \cdot f_V$$

$$f_C = m \cdot f_P$$

Figure 3:
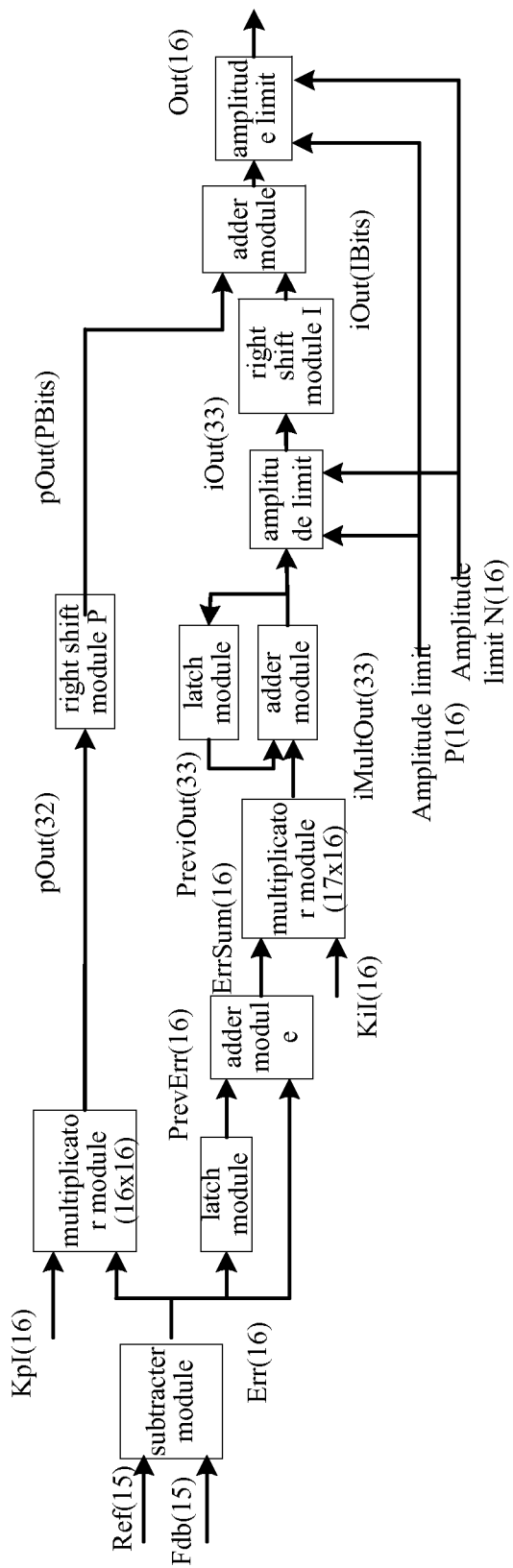
FIG. 3 is a data flow schematic diagram of a current ring forward channel model.

FIG. 3 is a data flow schematic diagram of the current ring forward channel. The expression method of the variables in the FIG. 3 is variable name ( ) wherein number in the bracket represents bit width of the variable. For example, KpI (16) represents that the bit width of the variable KpI (16) is 16 bit. FIG. 3 has shown an adder module, a subtracter module, a multiplicator module (16×16), a multiplicator module (17×16), a right shift module and an amplitude limit module. Wherein, the multiplicator module (16×16) represents that 16 bit width data multiplies 16 bit width data, and the output is 32 bit width; and the multiplicator module (17×16) represents that 17 bit width data multiplies 16 bit width data, and the output is 33 bit width.

The port description of the current ring module is as follows:
Model Current Loop
Input [14:0] Ref;
Input [14:0] Fdb;
Input [15:0] KpI;
Input [15:0] KiI;
Input [15:0] LimitP;
Input [15:0] LimitN;
Input [7:0] PBits;
Input [7:0] IBits;

The port description of the multiplicator module is as follows:
Model Multiply (16×16)
Input [15:0] a;
Input [15:0] b;
Output [31:0] Out;
Model Multiply (17×16)
Input [16:0] a;
Input [15:0] b;
Output [32:0] Out;

The port description of the amplitude limit module is as follows:
Model Limit
Input [15:0] LimitP;
Input [15:0] LimitN;
Input [15:0] IN;
Output[15:0]Out;

The language description of the latch module is as follows:

```
     If nRESET='0' then
        Out='0';
     Else
        Out=PrevOut;
     Endif
        PrevOut= Out;
```

The language description of the amplitude limit module is as follows:

```
     If IN <=LimitN then
        Out =LimitN
     Elseif  IN >=LimitP then
        Out =LimitP
     Else
        Out=IN
     Endif
```

Other modules in above Figure are expressed by expression in C language. For example, the adder module, subtracter module, multiplicator module, right shift module I, right shift module P each uses addition, subtraction, multiplication, and shift operations in C language. Wherein, the right shift module P is used to right shift for 32-Pbits, and the right shift module I is used to right shift for 33-Ibits.

The velocity ring model is the same as the current ring model, so isn't described in detail for concision.

Figure 4:
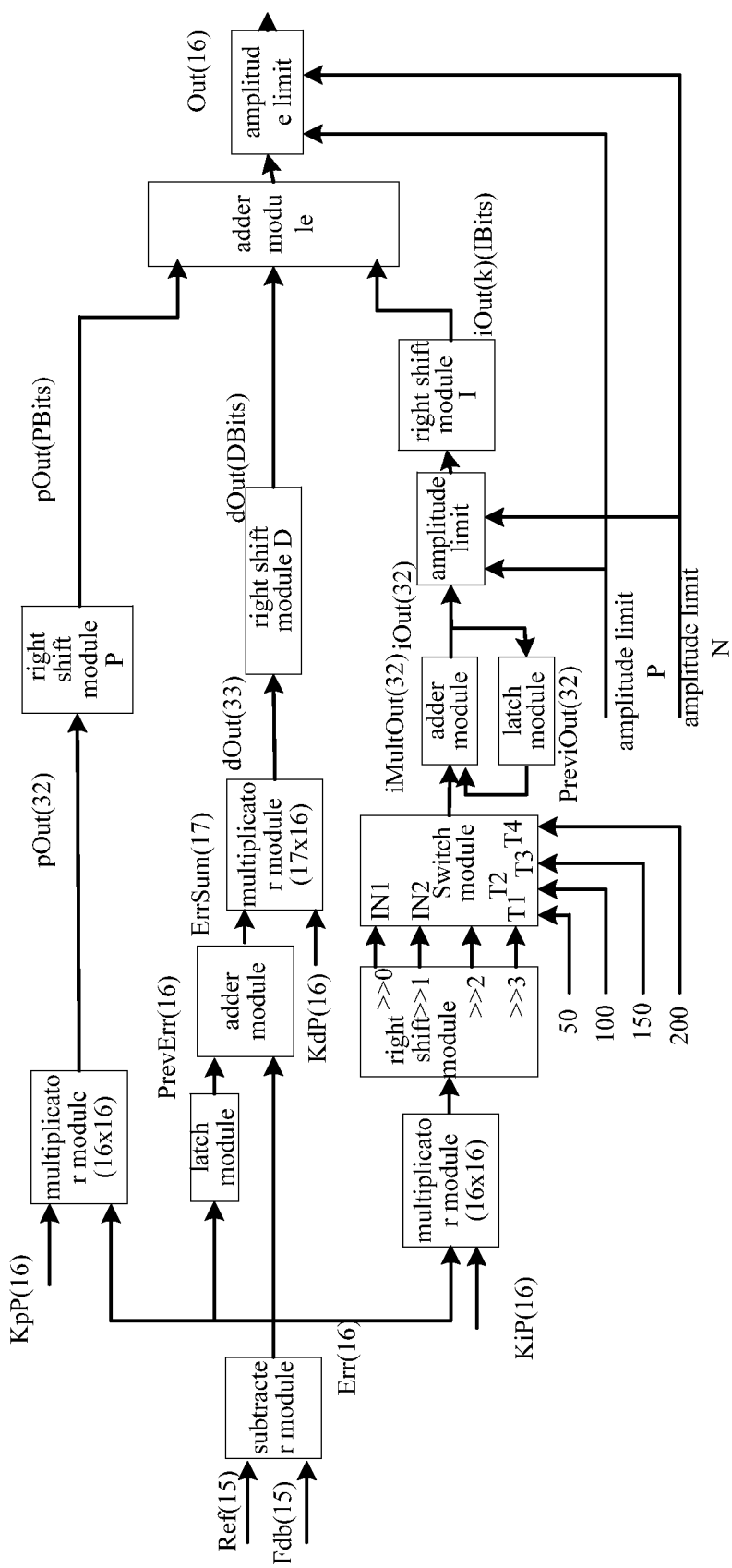
FIG. 4 is a data flow schematic diagram of a position ring forward channel model.

FIG. 4 is a data flow schematic diagram of a position ring forward channel model. Wherein, the right shift module P is used to right shift for 32-Pbits, the right shift module I is used to right shift for 32-Ibits, and the right shift module D is used to right shift for 33-Dbits.

The interface description of the position ring module is as follows:
Model PositionLoop
Input [14:0] Ref;
Input [14:0] Fdb;
Input [15:0] KpP;
Input [15:0] KiP;
Input [15:0] KdP;
Input [15:0] LimitP;
Input [15:0] LimitN;
Input [7:0] PBits;
Input [7:0] IBits;
Input [7:0] DBits;

The port description of the right shift module is as follows:
Model Shift
Input [31:0] IN;
Output[31:0]Out1;
Output[31:0]Out2;
Output[31:0]Out3;
Output[31:0]Out4;

The interface description of the switch module is as follows:
Model Switch
Input [31:0] IN1;
Input [31:0] IN2;
Input [31:0] IN3;
Input [31:0] IN4;
Input [7:0] Threshold1; (T1 port in switch module in FIG. 1-4)
Input [7:0] Threshold2; (T2 port in switch module in FIG. 1-4)

Input [7:0] Threhold3; (T3 port in switch module in FIG. 1-4)
Input [7:0] Threhold4; (T4 port in switch module in FIG. 1-4)
Output [31:0]Out;
Wherein, the language description of the switch module is as follows:

```
If Select<Threhold1 then
    Out=IN1;
Else if Select<Threhold2 then
    Out=IN2;
Else if Select<Threhold3 then
    Out=IN3;
Else if Select<Threhold4 then
    Out=IN4;
Else
        Out=0;
Endif
``` the language description of the right shift module is as follows:
Out1=IN;
Out2=IN>>1;
Out3=IN>>2;
Out4=IN>>3.

Figure 5:
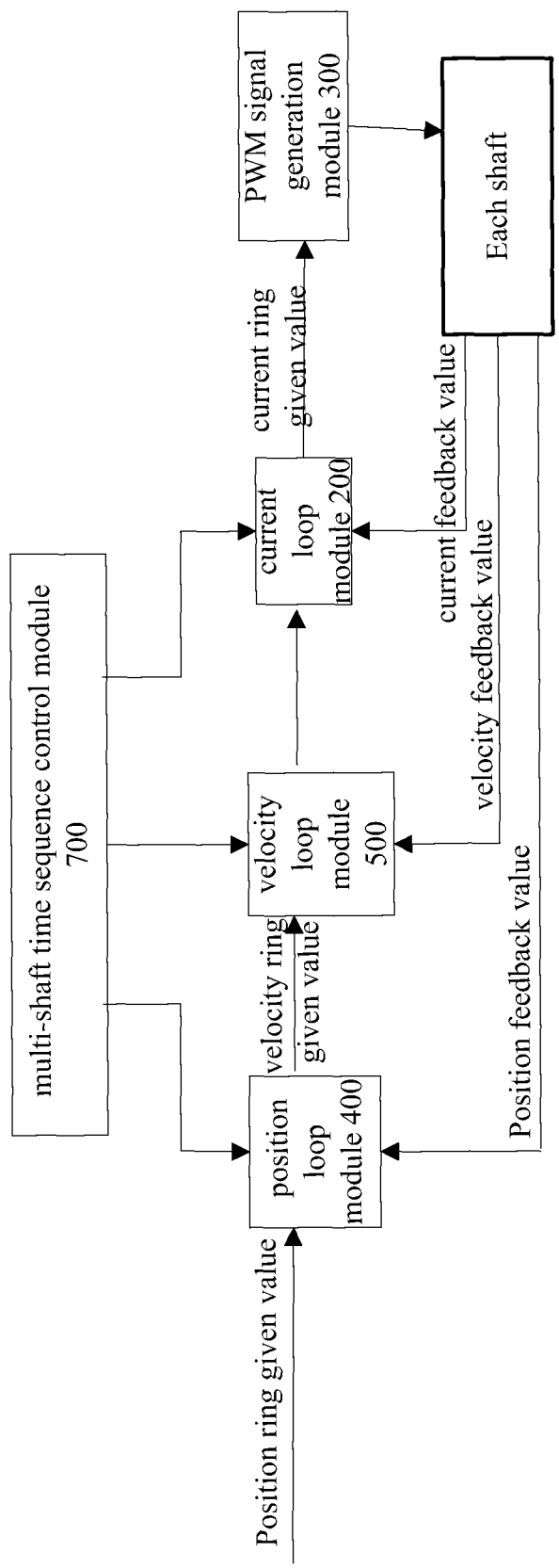
FIG. 5 is a system block diagram of the control system of multi-shaft servo motor according to a first embodiment of present invention.

The latch module and amplitude limit module are described above, so are not described in detail for concision. Other modules, such as the adder module, subtracter module, multiplicator module (16×16), multiplicator module (17×16), right shift module P, D, and I each uses addition, subtraction, multiplication, and shift operations in C language FIG. 5 is a system block diagram of the control system of multi-shaft servo motor according to a first embodiment of present invention. As shown in FIG. 5, the control system of multi-shaft servo motor comprises a position ring module 400 for receiving a position loop given value and a position feedback value of respective shelves and figuring out a velocity loop given value; a velocity loop module 500 for receiving the velocity loop given value and a velocity feedback value of respective shelves and figuring out a current loop given value; a current loop module 200 for receiving the velocity loop given value and a velocity feedback value of respective shelves and outputting a current loop output value; a PWM signal generation module 300 for receiving the current loop output value from the current loop module 200 and generating a PWM signal for controlling respective shelves of the servo motor and a multi-shaft time sequence control module 700 for controlling the position loop module 400, the velocity loop module 500 and the current loop module 200 to receive and process the signals.

Figure 6:
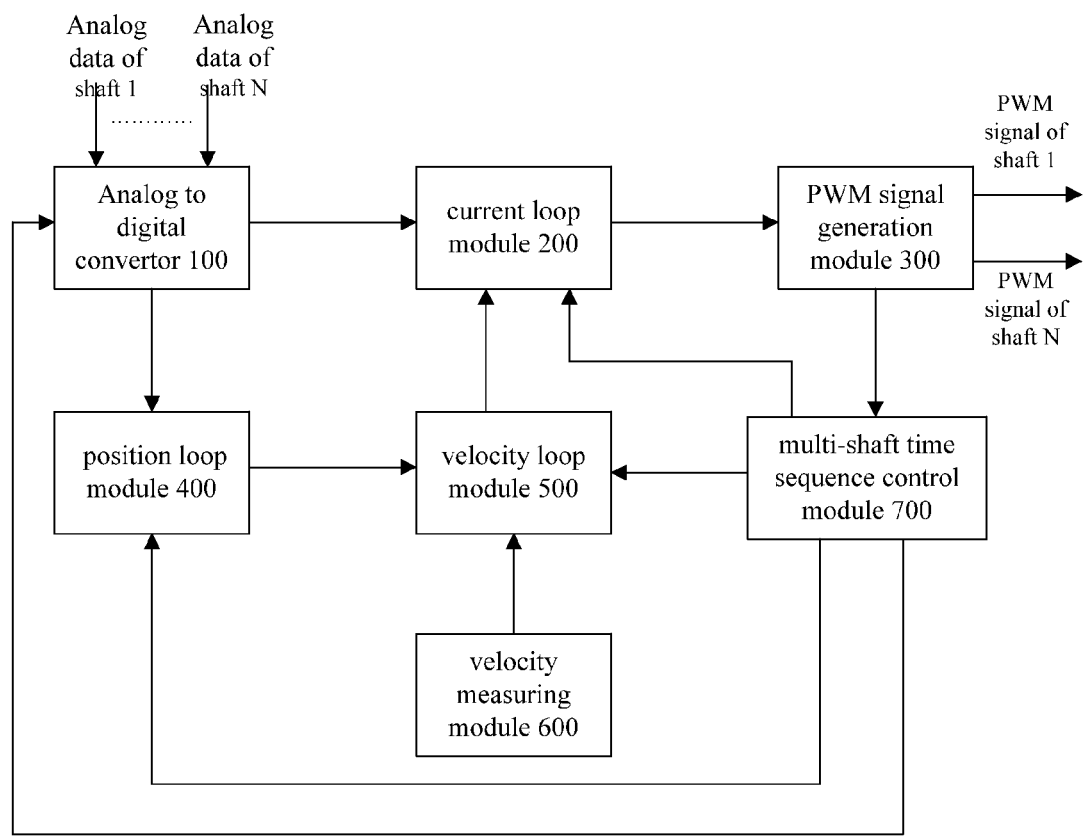
FIG. 6 is a system block diagram of the control system of multi-shaft servo motor according to a second embodiment of present invention.

FIG. 6 is a system block diagram of the control system of multi-shaft servo motor according to a second embodiment of present invention. The control system of multi-shaft servo motor further comprises a A/D convertor 100 for obtaining the position feedback value and velocity feedback value under the control of the multi-shaft time sequence control module 700; a velocity measuring module 600 for obtaining the velocity feedback value of respective shelves under the control of the multi-shaft time sequence control module 700. The A/D convertor 100 is further used to obtaining the position loop given value, the velocity loop given value, and/or the current loop given value under the control of the multi-shaft time sequence control module 700.

Figure 7:
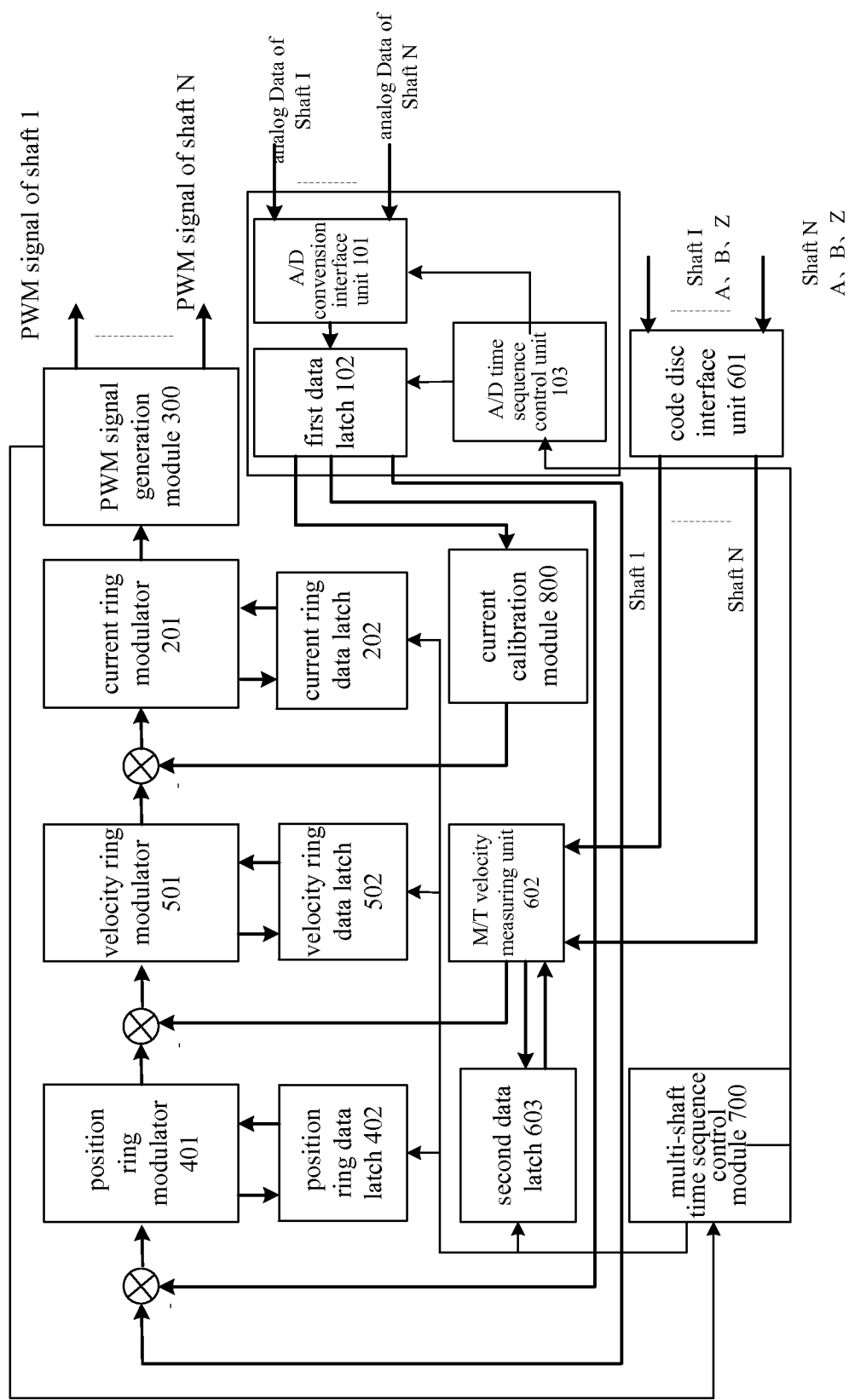
FIG. 7 is a system block diagram of the control system of multi-shaft servo motor according to a third embodiment of present invention.

FIG. 7 is a system block diagram of the control system of multi-shaft servo motor according to a third embodiment of present invention. Referring to FIG. 7, we see that the present system mainly comprises position ring modulator 401, position ring data latch 402, velocity ring modulator 501, velocity ring data latch 502, current ring modulator 201, current ring data latch 202, PWM signal generation module 300, A/D interface unit 101, A/D time sequence control unit 103, a first data latch 102, code disc interface unit 601, M/T velocity measuring unit 602, a second data latch 603, multi-shaft time sequence control module 700, current calibration module 800. Wherein, position ring modulator 401, position ring data latch 402, velocity ring modulator 501, velocity ring data latch 502, current ring modulator 201, current ring data latch 202 are each corresponding to the position ring, velocity ring and current ring. The current calibration module 800 and the A/D convertor 100 consist of the current feedback channel shown in FIG. 1. The code disc interface unit 601 and M/T velocity measuring unit 602 consist of the velocity feedback channel shown in FIG. 1. The A/D convertor 100 forms the position ring feedback channel shown in FIG. 1.

Wherein, when the control system of multi-shaft servo motor is operating in the position ring, the A/D interface unit 101 obtains the position ring given value, the position feedback value, and the current feedback value; when the control system of multi-shaft servo motor is operating in the velocity ring, the A/D interface unit 101 obtains the velocity ring given value, the current feedback value; when the control system of multi-shaft servo motor is operating in the current ring, the A/D interface unit 101 obtains the current ring given value and the current feedback value. The first data latch 102 is used to latch the obtained values under the control of the A/D time sequence control unit 103.

Meanwhile, the position ring, velocity ring and current ring each processes corresponding data at different refreshing frequencies (the refreshing frequency of the current ring fc<the refreshing frequency of the velocity ring fv<the refreshing frequency of the position ring fp), so as to update corresponding data.

In an embodiment of present invention, the refreshing rate of position ring is 1~5 KHz (0.2-1 ms) and the international leading level is 0.5 ms; the refreshing rate of velocity ring is 5-10 KHz (100-200 usec) and the international leading level is 250 usec; the refreshing rate of current ring is 20-40 KHz (25-50 usec); and the rpm range is 0±10000 r/min.

When the control system of multi-shaft servo motor is controlled by the multi-shaft time sequence control module 700 to operate in the position ring, the position ring module 400 obtains the position ring given value and the position feedback value from the A/D convertor 100, the velocity ring module 500 obtains the velocity ring given value from the position ring module 400 and obtains the velocity feedback value from the velocity measuring module 600, the current ring module 200 obtains the current ring given value from the velocity ring module 500 and obtains the current feedback value from the A/D convertor 100.

When the control system of multi-shaft servo motor is controlled by the multi-shaft time sequence control module 700 to operate in the velocity ring, the velocity ring module 500 obtains the velocity feedback value from the velocity measuring module 600 and obtains the velocity ring given value from the A/D convertor 100, the current ring module 200 obtains the current ring given value from the velocity ring module 500 and obtains the current feedback value from the A/D convertor 100; when the control system of multi-shaft servo motor is controlled by the multi-shaft time sequence control module 700 to operate in the current ring, the current ring module 200 obtains the current feedback value and the current ring given value from the A/D convertor 100, and outputting the current ring outputting value to a PWM signal generating module 300, so as to generate a signal for controlling a power device for control motion of a motor.

Figure 8:
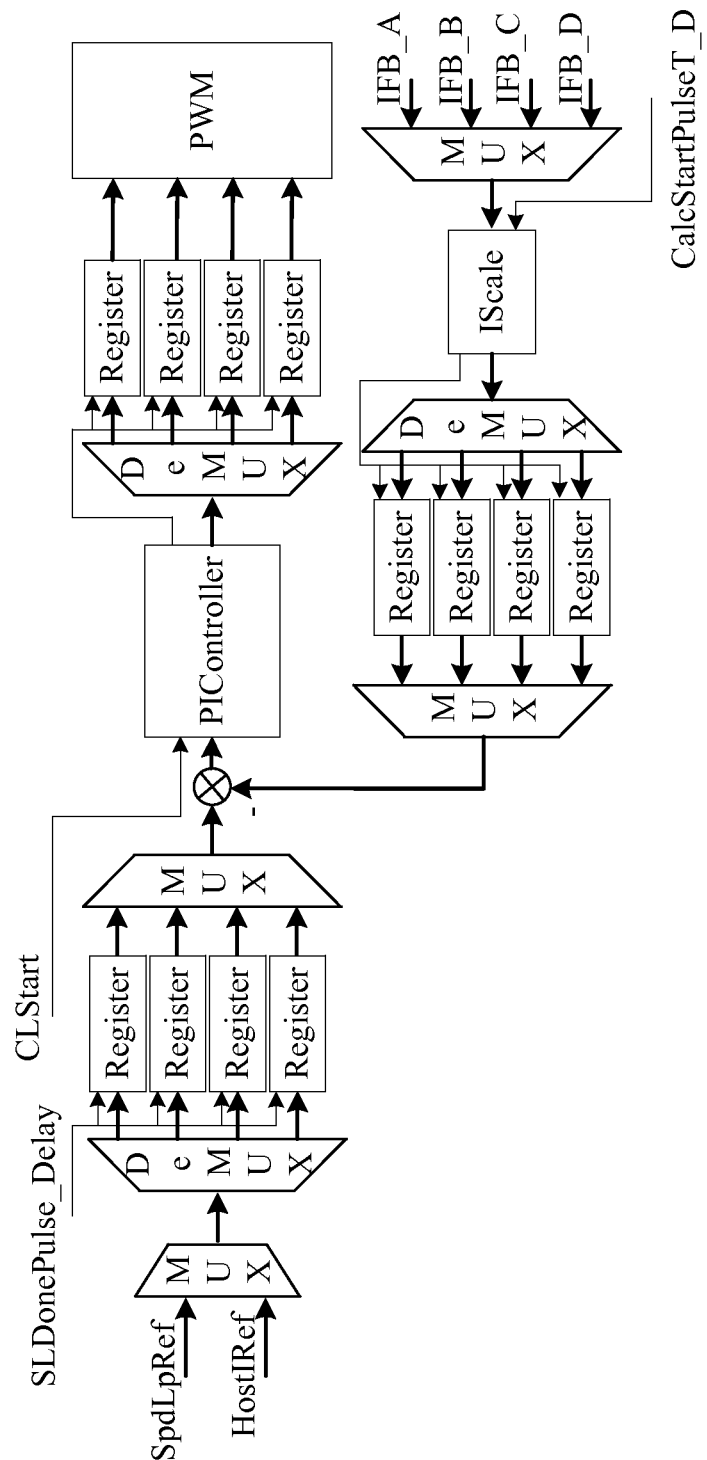
FIG. 8 is a current ring data flow diagram of the control system of multi-shaft servo motor disclosed in FIG. 7.
Figure 9:
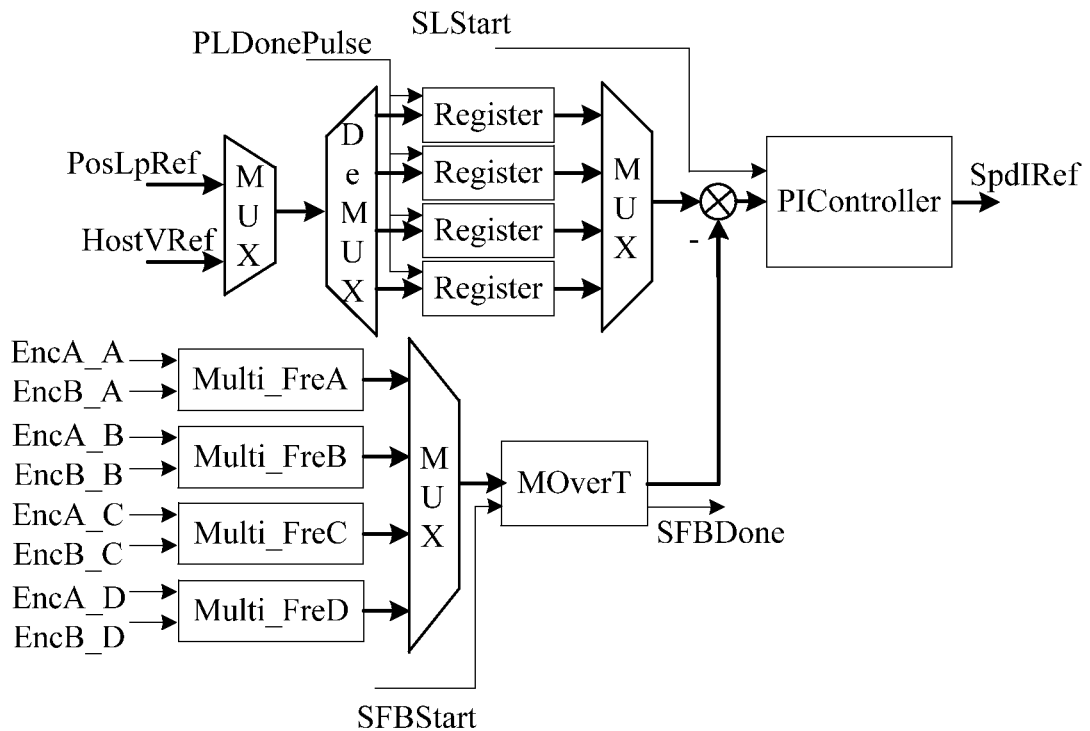
FIG. 9 is a velocity ring data flow diagram of the control system of multi-shaft servo motor disclosed in FIG. 7.
Figure 10:
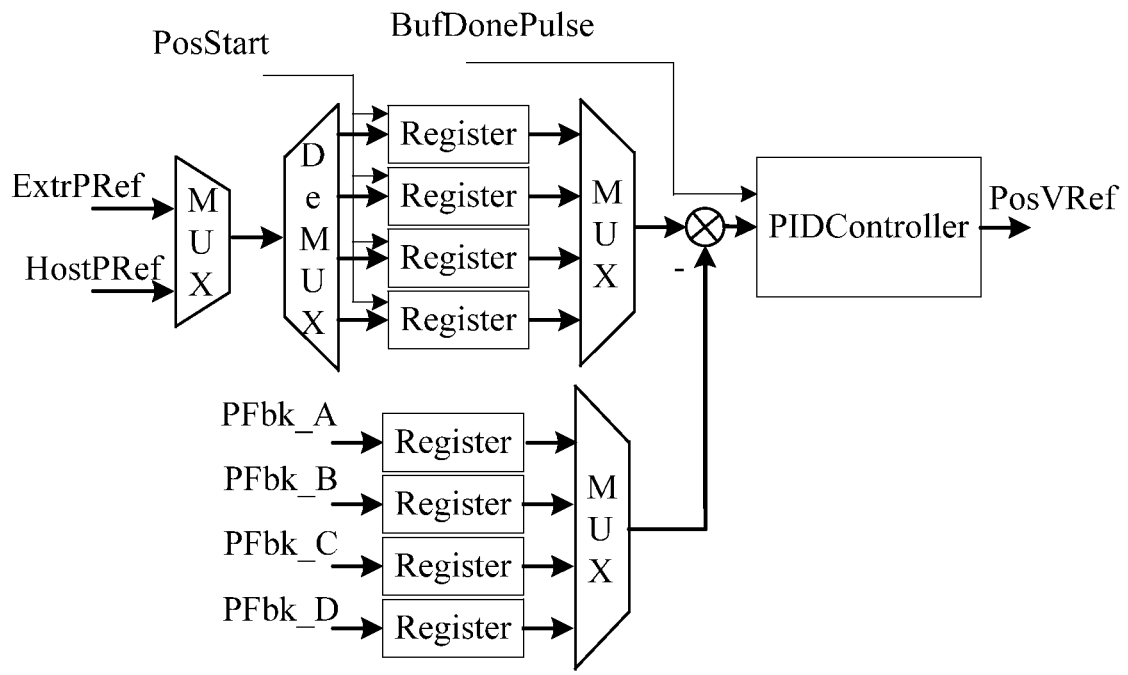
FIG. 10 is a position ring data flow diagram of the control system of multi-shaft servo motor disclosed in FIG. 7.

When analyze FIG. 7 more detaily, data flows of a current ring, a velocity ring and a position ring are shown in FIG. 8-10, wherein, the wide line in the Figs represents the direction of data flow, the thin line represents the transfer of control signal of control data flow.

Figure 11:
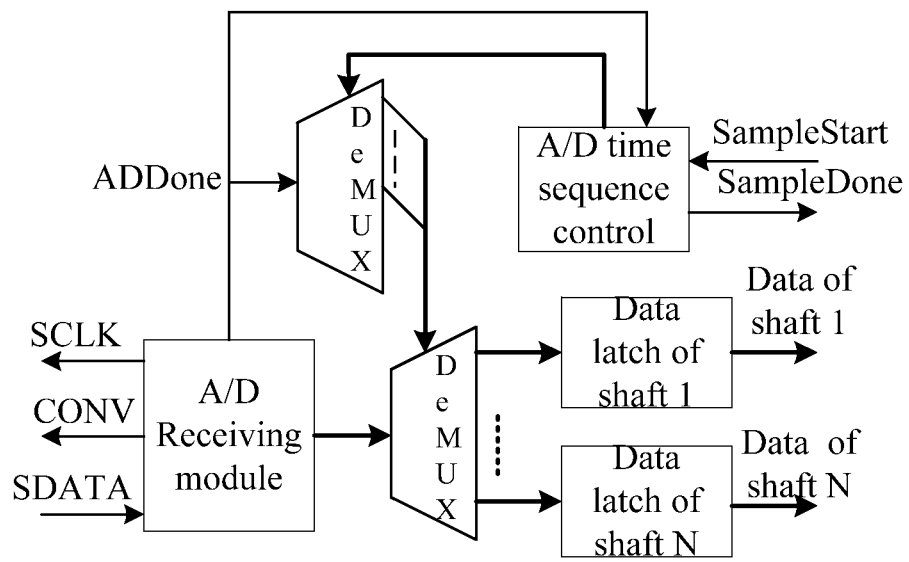
FIG. 11 is a system block diagram of the A/D convertor according to present invention.

FIG. 11 is a system block diagram of the A/D convertor according to present invention, which discloses A/D interface unit 101, first data latch 102 and A/D time sequence control unit 103.

Figure 12:
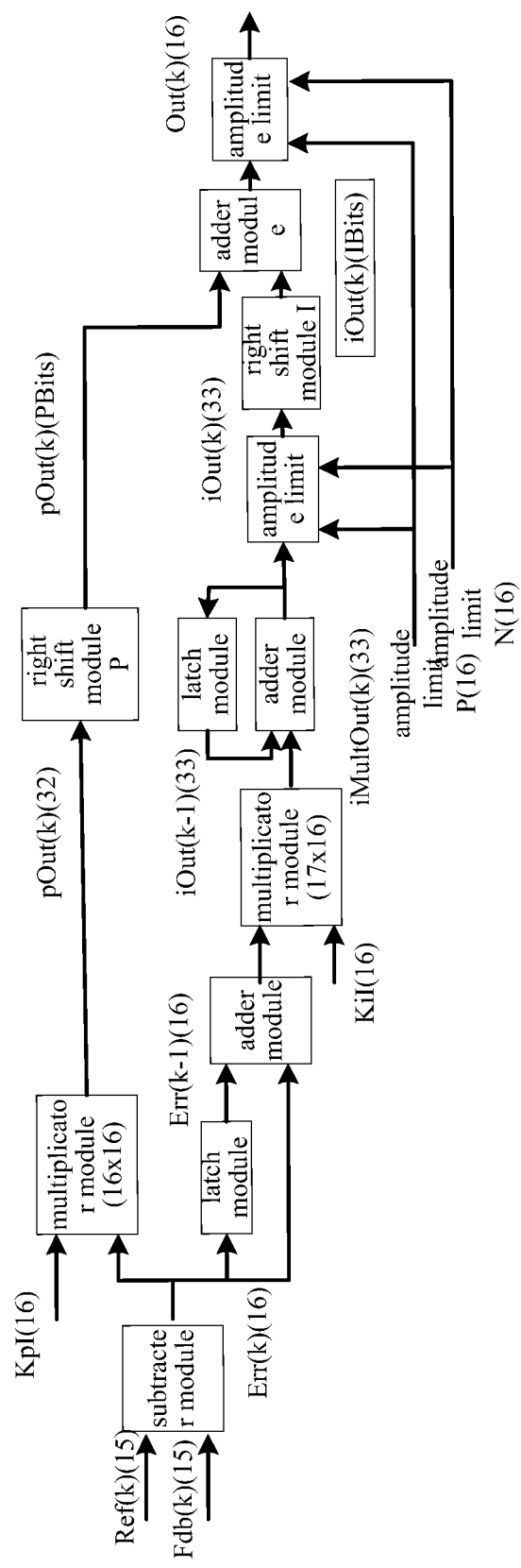
FIG. 12 is a data flow diagram of a PI modulator.
Figure 13:
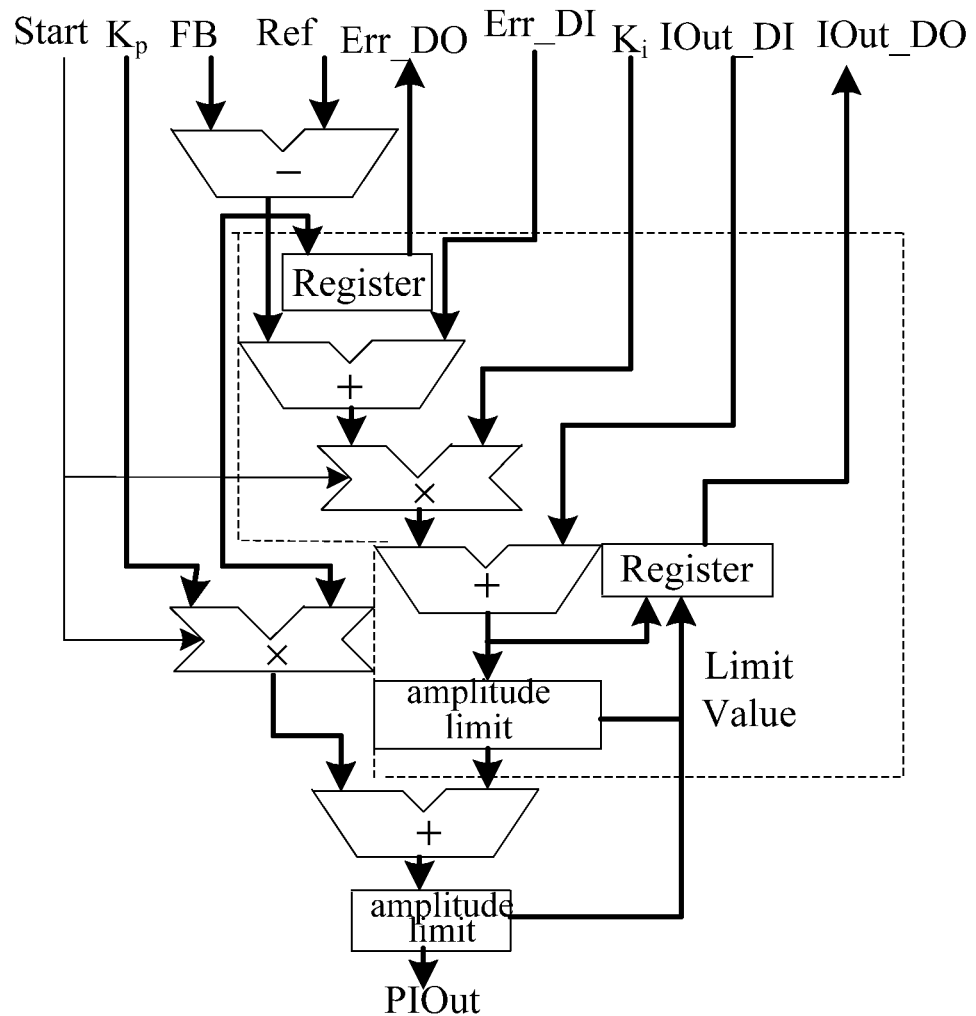
FIG. 13 is a system block diagram of the PI modulator.

FIG. 12 is a data flow diagram of a PI modulator. FIG. 13 is a system block diagram of the PI modulator. In present invention, the current ring and the velocity ring all employs a PI modulator which employs a bilinear transformation.

Figure 14:
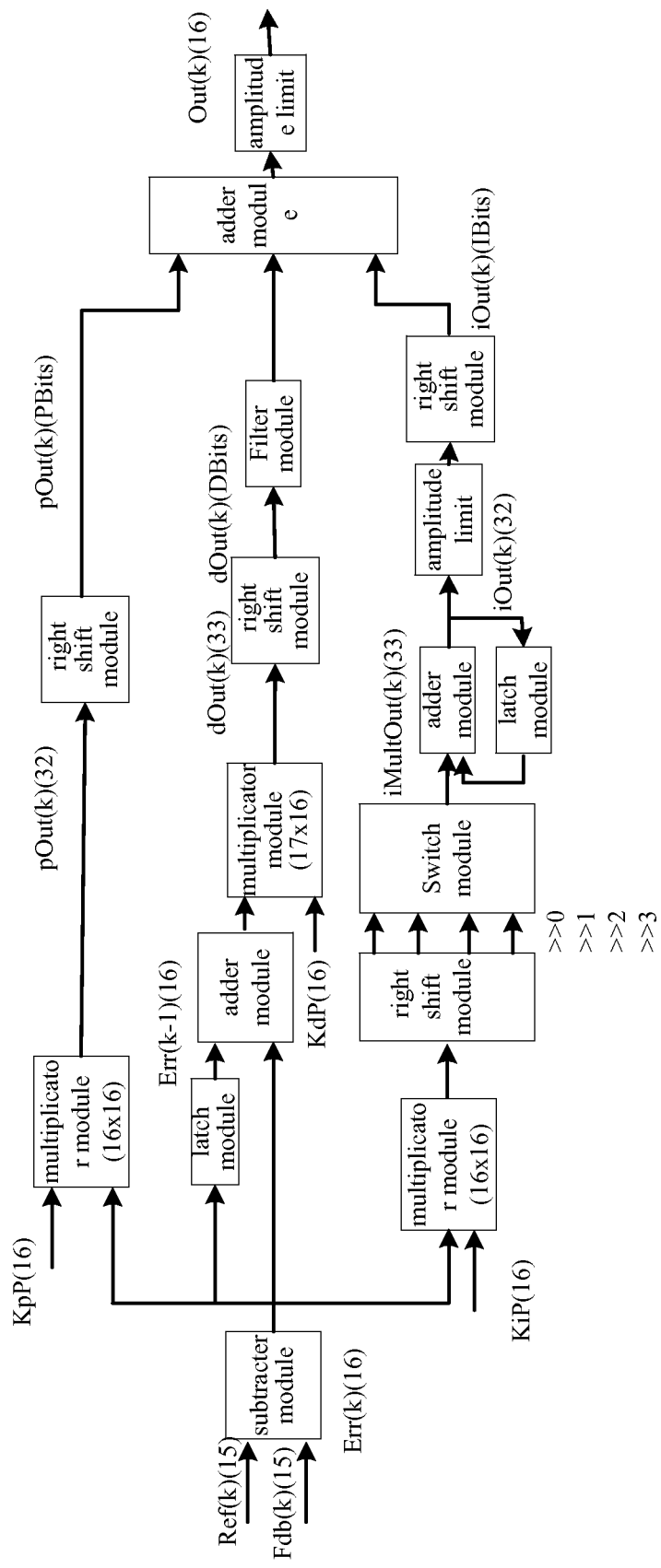
FIG. 14 is a data flow diagram of a PID modulator.
Figure 15:
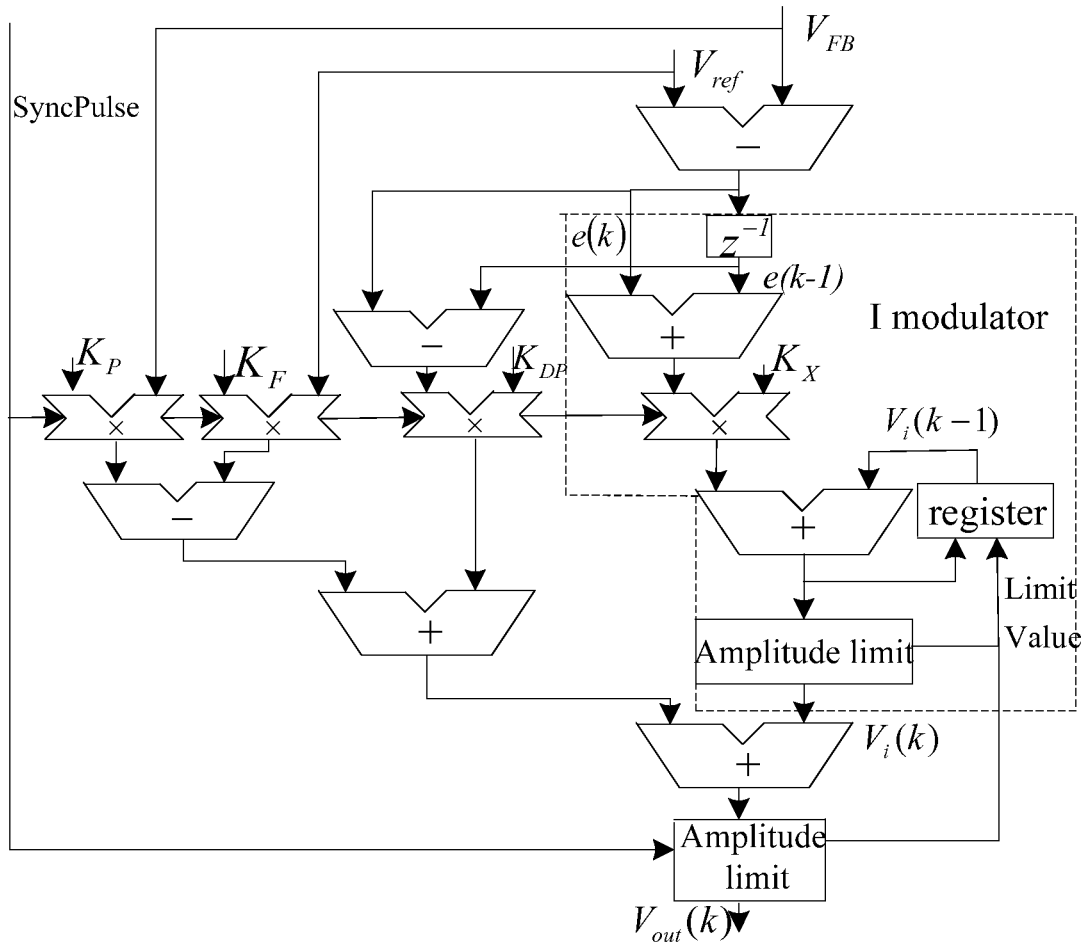
FIG. 15 is a system block diagram of the PID modulator.

FIG. 14 is a data flow diagram of a PID modulator. FIG. 15 is a system block diagram of the PID modulator. In present invention, the position ring employs a PID modulator, wherein, the I and D each employs a backward difference method.

Figure 16:
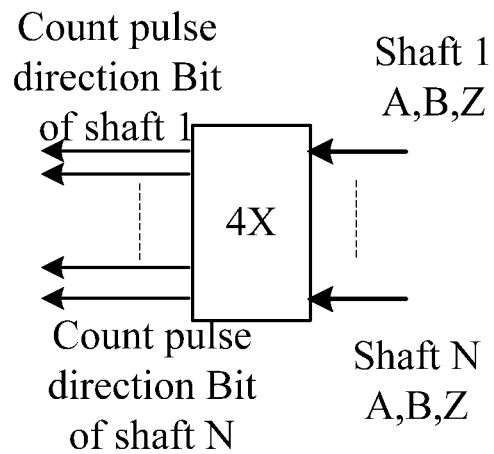
FIG. 16 is a system block diagram of the code disc interface unit.
Figure 17:
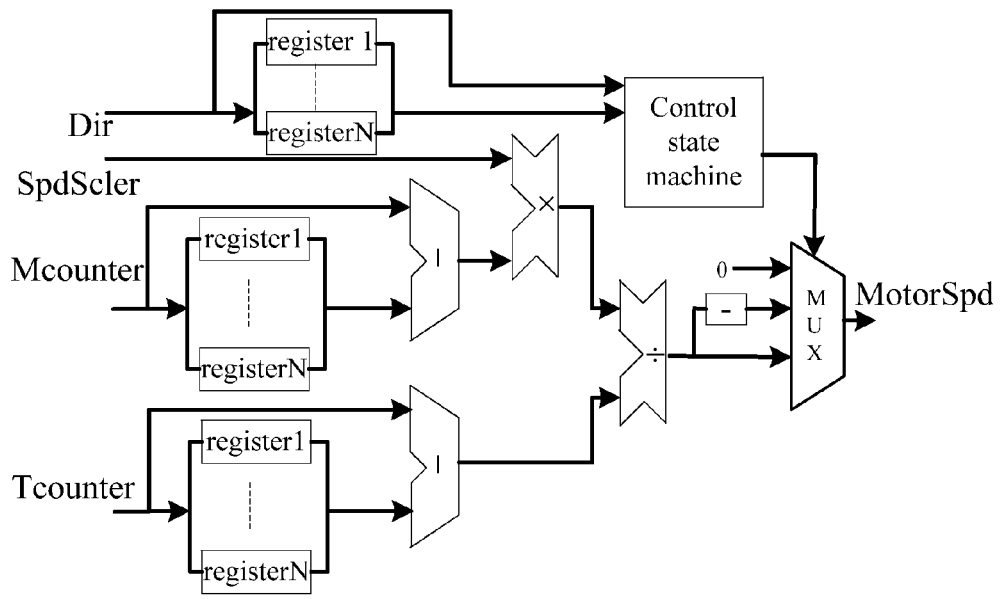
FIG. 17 is a system block diagram of the M/T velocity measuring unit.

FIG. 16 is a system block diagram of the code disc interface unit. FIG. 17 is a system block diagram of the M/T velocity measuring unit which comprises a M/T velocity measuring part and a data latching part.

Figure 18:
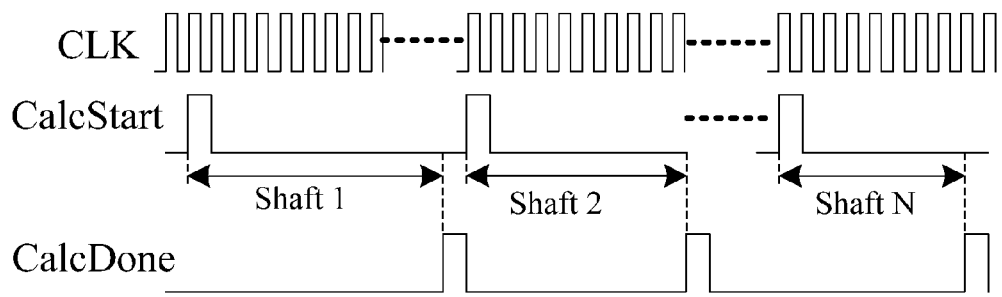
FIG. 18 is a time sequence diagram of the multi-shaft time sequence control unit of the multi-shaft time sequence control module.

In a proffered embodiment of present invention, the multi-shaft time sequence control module may comprises a multi-shaft time sequence control unit and a single shaft data calculation time sequence control unit. Wherein, the multi-shaft time sequence control unit is used to control the conversion between shaft 1-n, and the single shaft data calculation time sequence control unit is used to implement data calculation for control each shaft. FIG. 18 is a time sequence diagram of the multi-shaft time sequence control unit of the multi-shaft time sequence control module. In a proffered embodiment of present invention, n=4.

Figure 19:
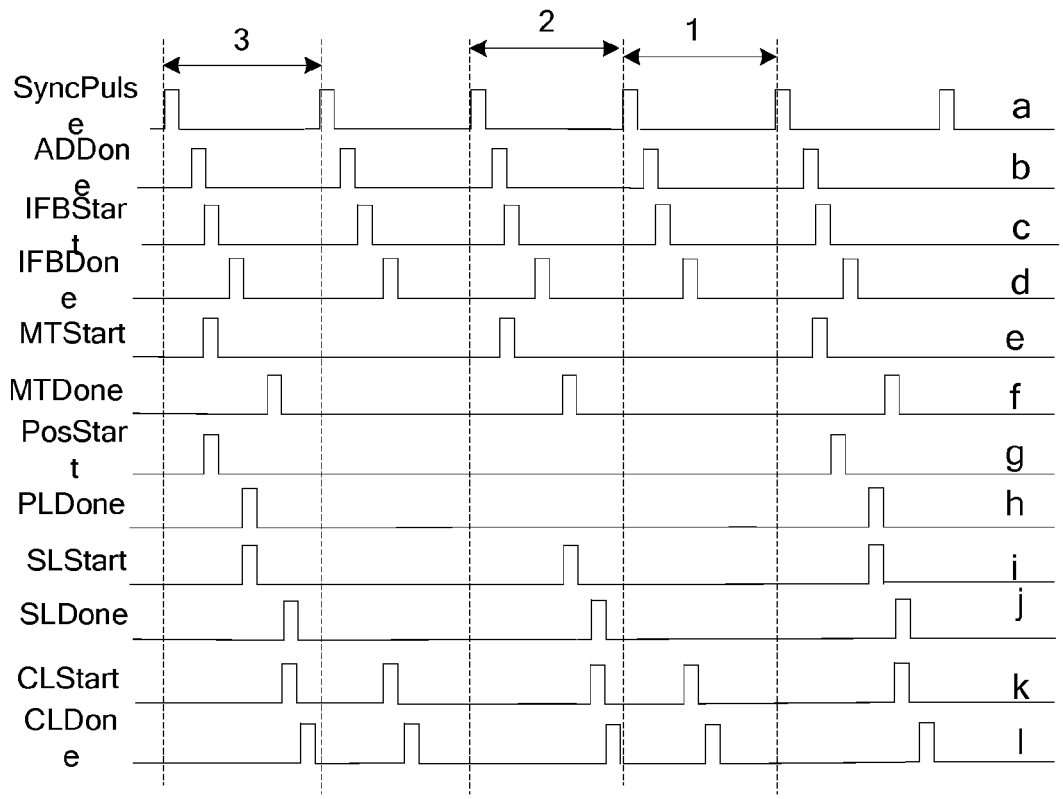
FIG. 19 is a time sequence diagram of a single shaft data calculation and control unit of the multi-shaft time sequence control module.

FIG. 19 is a time sequence diagram of a single shaft data calculation and control unit of the multi-shaft time sequence control module. Each shaft comprises three loops, that is, a position ring, a velocity ring and a current ring, which corresponding to three conditions:

(1) There is only a current ring, as shown in 1 of FIG. 18;
(2) There are a current ring and a velocity ring, as shown in 2 of FIG. 18;
(3) There are a position ring, a current ring and a velocity ring, as shown in 3 of FIG. 3.

Time sequence a represents PWM synchronization signal, which is synchronization signal of the control system of multi-shaft servo motor. All the data conversion and calculation are synchronized by the time sequence a.

Time sequences b-f represent correlative signals of the feedback channel, wherein, ADDone represents a completion signal of the data conversion part, IFBStart and MTStart each represents start of data calculation of the current feedback channel, and the start of data calculation of the velocity feedback channel. IFBDone and MTDone each represents end of data calculation of the current feedback channel and velocity feedback channel.

Time sequences h-I represent correlative signals of the forward channel, wherein, SLStart and CLStart each represents start of data calculation of the forward channel of the velocity ring and current ring; SLDone and CLDone each represents the end of data calculation of the forward channel of the velocity ring and current ring.

Time sequence g represents correlative signals of the forward channel and the backward channel, which start to calculate signal for the position ring signal.

Figure 20:
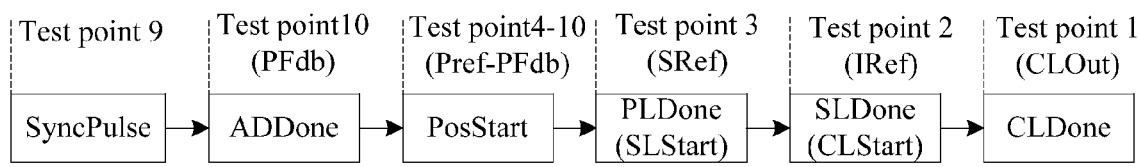
FIG. 20 is a time sequence diagram of the multi-shaft time sequence control module when the control system of multi-shaft servo motor operates in the position ring.
Figure 21:
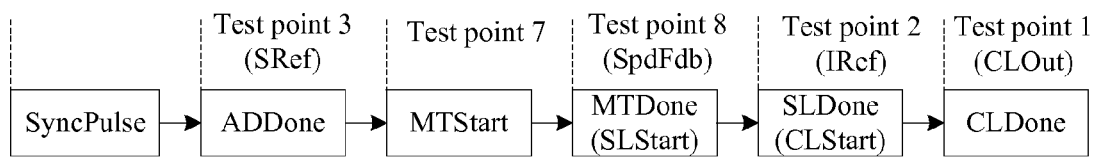
FIG. 21 is a time sequence diagram of the multi-shaft time sequence control module when the control system of multi-shaft servo motor operates in the velocity ring.
Figure 22:
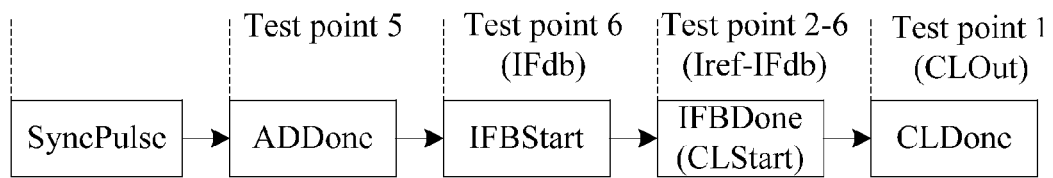
FIG. 22 is a time sequence diagram of the multi-shaft time sequence control module when the control system of multi-shaft servo motor operates in the current ring.

For situation 3 as shown in FIG. 19, the control system of multi-shaft servo motor implements calculations of the position ring, velocity ring and current ring, and the time sequence is shown as FIG. 20. For situation 2 as shown in FIG. 19, the control system of multi-shaft servo motor implements calculations of the velocity ring and current ring, and the time sequence is shown as FIG. 21. For situation 1 as shown in FIG. 19, the control system of multi-shaft servo motor implements calculation of the current ring, and the time sequence is shown as FIG. 22.

By employing the control system of multi-shaft servo motor, complex AC servo motor vector control, moment control, velocity control, position closed ring control can be implemented by digital, multi-shaft, single chip hardware, in such a way, the volume of the servo system is more compact, and the dynamic capability is improved for 2-10 times. The control strategy of high capability of the system structure of the chip enable the energy index of the control system to be improved for 2-3 times, enable the peripheral devices to reduce for 50-80%, enable the volume of the whole machine to reduce for 2-4 times and enable the product cost to reduce for 2-3 times.

The present invention employs an idea of controller time division multiplexing, that is, using time resource to replace space resource. The sampling frequency is 40 kHz. A servo driving unit with 4 shaft can be implemented by a control inner core.

The foregoing description is just the preferred embodiment of the invention. It is not intended to exhaustive or to limit the invention. Any modifications, variations, and amelioration without departing from the spirit and scope of the present invention should be included in the scope of the prevent invention.

What is claimed is:

1. A control system of multi-shaft servo motor, wherein, comprises:
    a position loop module (400) for receiving a position loop given value and a position feedback value of respective shelves and figuring out a velocity loop given value;
    a velocity loop module (500) for receiving the velocity loop given value and a velocity feedback value of respective shelves and figuring out a current loop given value;
    a current loop module (200) for receiving the current loop given value and a current feedback value of respective shelves and outputting a current loop output value;
    a PWM signal generation module (300) for receiving the current loop output value from the current loop module (200) and generating a PWM signal for controlling respective shelves of the servo motor; and
    a multi-shaft time sequence control module (700) for controlling the position loop module (400), the velocity loop module (500), the current loop module (200) and the PWM signal generation module to receive and process the signals.

2. The control system of multi-shaft servo motor according to claim 1, wherein, the control system of multi-shaft servo motor further comprises a A/D convertor (100) for obtaining the position feedback value and/or current feedback value under the control of the multi-shaft time sequence control module (700); a velocity measuring module (600) for obtaining the velocity feedback value of respective shelves under the control of the multi-shaft time sequence control module (700).

3. The control system of multi-shaft servo motor according to claim 2, wherein, the A/D convertor (100) is further used for obtaining the position loop given value, the velocity loop given value, and/or the current loop given value under the control of the multi-shaft time sequence control module (700).

4. The control system of multi-shaft servo motor according to claim 3, when the control system of multi-shaft servo motor is controlled by the multi-shaft time sequence control module (700) to operate in the position ring, the position ring module (400) obtains the position ring given value and the position feedback value from the A/D convertor (100), the velocity ring module (500) obtains the velocity ring given value from the position ring module (400) and obtains the velocity feedback value from the velocity measuring module (600), the current ring module (200) obtains the current ring given value from the velocity ring module (500) and obtains the current feedback value from the A/D convertor (100); when the control system of multi-shaft servo motor is controlled by the multi-shaft time sequence control module (700) to operate in the velocity ring, the velocity ring module (500) obtains the velocity feedback value from the velocity measuring module (600) and obtains the velocity ring given value from the A/D convertor (100), the current ring module (200) obtains the current ring given value from the velocity ring module (500) and obtains the current feedback value from the A/D convertor (100); when the control system of multi-shaft servo motor is controlled by the multi-shaft time sequence control module (700) to operate in the current ring, the current ring module (200) obtains the current feedback value and the current ring given value from the A/D convertor (100).

5. The control system of multi-shaft servo motor according to claim 3, wherein, the A/D convertor (100) further comprises a A/D interface unit (101), a A/D time sequence control unit (103) and a first data latch (102), wherein, when the control system of multi-shaft servo motor is operating in the position ring, the A/D interface unit (101) obtains the position ring given value, the position feedback value, and the current feedback value; when the control system of multi-shaft servo motor is operating in the velocity ring, the A/D interface unit (101) obtains the velocity ring given value, the current feedback value; when the control system of multi-shaft servo motor is operating in the current ring, the A/D interface unit (101) obtains the current ring given value and the current feedback value; the first data latch (102) is used to latch the obtained values under the control of the A/D time sequence control unit (103).

6. The control system of multi-shaft servo motor according to claim 3, wherein, the control system of multi-shaft servo motor further comprises a current calibration module (800) for calibrating the current feedback value from the A/D convertor (100) and sending the calibrated current feedback value to the current ring module (200).

7. The control system of multi-shaft servo motor according to claim 3, wherein, the velocity measuring module (600) comprises a code disc interface unit (601), a M/T velocity measuring unit (602) and a second data latch (603), wherein, the code disc interface unit (601) is used to obtain an angular displacement of each shaft, the M/T velocity measuring unit (602) is used to transform the angular displacement to the velocity feedback value; the second data latch (603) is used to latch the velocity feedback value under the control of the multi-shaft time sequence control module (700).

8. The control system of multi-shaft servo motor according to claim 1, wherein, the position ring module (400) further comprises a position ring modulator (401) and a position ring data latch (402); the position ring modulator (401) is used to receive the position ring given value and the position feedback value and to generate the velocity ring given value, the position ring data latch (402) is used to latch the position ring given value, the position feedback value and/or the velocity ring given value under the control of the multi-shaft time sequence control module (700).

9. The control system of multi-shaft servo motor according to claim 1, wherein, the velocity ring module (500) further comprises a velocity ring modulator (501) and a velocity ring data latch (502); the velocity ring modulator (501) is used to receive the velocity ring given value and the velocity feedback value and to generate the current ring given value, the velocity ring data latch (502) is used to latch the velocity ring given value, the velocity feedback value and/or the current ring given value under the control of the multi-shaft time sequence control module (700).

10. The control system of multi-shaft servo motor according to claim 1, wherein, the current ring module (200) further comprises a current ring modulator (201) and a current ring data latch (202); the current ring modulator (201) is used to receive the current ring given value and the current feedback value and to generate the current ring output value, the current ring data latch (202) is used to latch the current ring given value, the current feedback value and/or the current ring output value under the control of the multi-shaft time sequence control module (700).

* * * * *